US008517365B2

(12) United States Patent
Velez

(10) Patent No.: US 8,517,365 B2
(45) Date of Patent: Aug. 27, 2013

(54) CLAMP ASSEMBLY

(75) Inventor: Lawrence Velez, Houston, TX (US)

(73) Assignee: Sumner Manufacturing Co., Inc., Houston, TX (US)

( * ) Notice: Subject to any disclaimer, the term of this patent is extended or adjusted under 35 U.S.C. 154(b) by 99 days.

(21) Appl. No.: 13/292,722

(22) Filed: Nov. 9, 2011

(65) Prior Publication Data

US 2013/0113150 A1  May 9, 2013

(51) Int. Cl.
*B25B 1/00* (2006.01)
*B25B 1/02* (2006.01)
*B23P 19/04* (2006.01)
*B25B 5/10* (2006.01)

(52) U.S. Cl.
USPC ............................. 269/156; 269/140; 29/259

(58) Field of Classification Search
USPC .................... 269/156, 153, 41, 140; 29/259, 29/264, 261
See application file for complete search history.

(56) References Cited

U.S. PATENT DOCUMENTS

| 1,482,694 | A | * | 2/1924 | Neill | 29/261 |
| 1,594,468 | A | * | 8/1926 | Riberdy | 29/260 |
| 2,303,560 | A | * | 12/1942 | Knight | 29/261 |
| 2,821,777 | A | * | 2/1958 | Keister | 29/259 |
| 3,551,988 | A | * | 1/1971 | Berbel et al. | 29/259 |
| 3,735,471 | A | * | 5/1973 | Kappler | 29/261 |
| 3,810,294 | A | * | 5/1974 | Link | 29/261 |
| 3,846,208 | A | * | 11/1974 | McElroy | 156/499 |
| 3,964,149 | A | * | 6/1976 | Hugh | 29/261 |
| 3,966,528 | A | * | 6/1976 | Christie | 156/293 |
| 4,019,233 | A | * | 4/1977 | Jirele | 29/261 |
| 4,398,706 | A | | 8/1983 | Kaulfuss | |
| 4,416,275 | A | * | 11/1983 | Omley | 606/1 |
| 4,445,677 | A | | 5/1984 | Hansen et al. | |
| 4,524,959 | A | * | 6/1985 | Kubo | 269/43 |
| 4,533,424 | A | | 8/1985 | McElroy | |
| D305,722 | S | * | 1/1990 | Riehm | D8/72 |
| 5,165,665 | A | | 11/1992 | Jolivette, Sr. | |
| 5,201,501 | A | * | 4/1993 | Fassler | 269/32 |
| 5,887,328 | A | * | 3/1999 | Rydin et al. | 29/259 |

(Continued)

OTHER PUBLICATIONS

International Search Report and Written Opinion of the International Searching Authority of corresponding counterpart international application No. PCT/US2011/059924 dated Apr. 9, 2012.

(Continued)

*Primary Examiner* — Lee D Wilson
*Assistant Examiner* — Alvin Grant
(74) *Attorney, Agent, or Firm* — Douglas W. Rommelmann; Andrews Kurth LLP

(57) ABSTRACT

A clamp assembly including a header assembly with first and second ends and a plunger having an aperture with a portion of the aperture being threaded, the aperture forming a portion of a bore extending through the header assembly. First and second arms, in opposing spaced relationship, are connected to the first and second ends, respectively, of the header assembly. A ram assembly having first and second ends, each end having a passageway through which at least a portion of one of the first and second arms extend. A stem assembly including an upper stem end coupled to a handle, a lower stem end rotatably connected to the ram assembly, and a threaded stem portion designed to engage the aperture threaded portion. The plunger has engaged and disengaged positions in which the aperture threaded portion and the threaded stem portion are threadedly engaged and disengaged, respectively, with each other.

23 Claims, 6 Drawing Sheets

(56) References Cited

U.S. PATENT DOCUMENTS

| | | | |
|---|---|---|---|
| 6,223,410 B1 * | 5/2001 | Sroka | 29/261 |
| 6,311,380 B1 * | 11/2001 | Chen | 29/259 |
| 6,406,587 B1 * | 6/2002 | Ralls et al. | 156/293 |
| 6,609,283 B1 * | 8/2003 | Somerville | 29/262 |
| 7,073,755 B2 * | 7/2006 | Michaud et al. | 248/72 |
| 7,213,317 B2 * | 5/2007 | Hu | 29/261 |
| 7,322,087 B1 * | 1/2008 | Hu et al. | 29/261 |
| 7,621,487 B2 | 11/2009 | Brown et al. | |
| 7,669,306 B2 * | 3/2010 | Palka | 29/261 |
| 7,685,688 B2 * | 3/2010 | Fan | 29/259 |
| 7,699,847 B2 * | 4/2010 | Sheldon et al. | 606/53 |

OTHER PUBLICATIONS

Ultra Fit Clamp product sheet, Sumner Manufacturing Co., Inc., undated.

Ultra Clamp® product sheet, Sumner Manufacturing Co., Inc., undated.

* cited by examiner

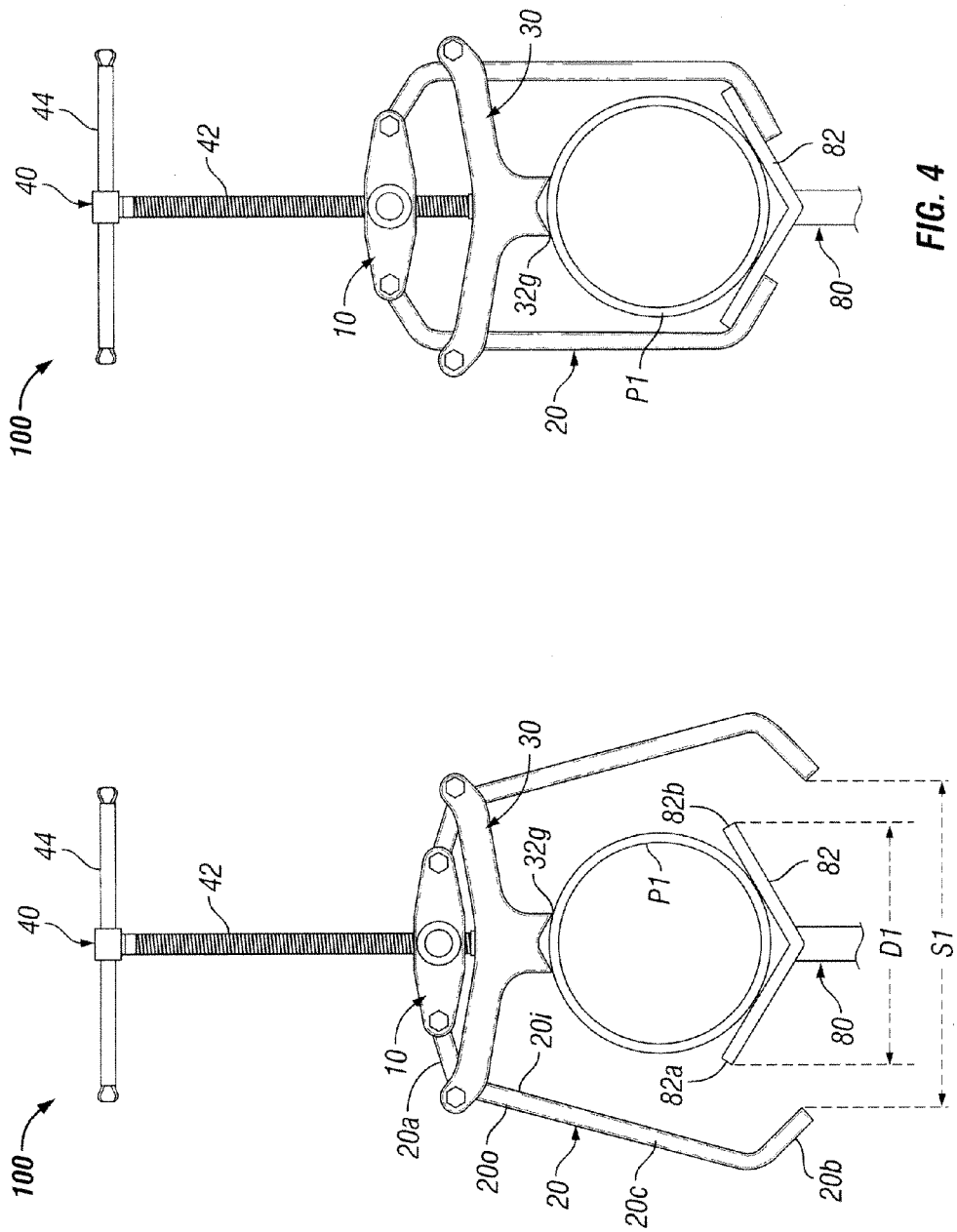

CLAMP ASSEMBLY

BACKGROUND OF THE INVENTION

1. Field of the Invention

The present invention relates generally to clamping devices, and more particularly to pipe clamping devices.

2. Description of the Related Art

Small, portable, generally triangular screw jacks have been employed for many years for the temporary support of mechanical objects during construction or other working operations. Screw jacks are especially useful in the support and alignment of pipe such as for positioning adjacent pipe sections and pipe fittings in precise alignment for welding operations. One such example of screw thread type pipe jack is disclosed in assignee's U.S. Pat. No. 5,165,665.

For the support of pipe, screw thread type pipe jacks are typically provided with various types of support heads depending upon the construction operation that is to be accomplished. For example, one type of support head may take the form of a V-shaped cradle that receives the pipe to be supported. This type of support head is known in the industry as a "V-head." Where the pipe is to be supported for rotation, a pipe support head having horizontally arranged, spaced rollers may be employed. This type of support head is referred to as a "roller head."

Several types of clamping devices are used in the manufacture of piping assemblies. For example, piping assemblies may comprise the joining, typically by welding, of pipe section to pipe section, pipe section to flange or tee or pipe fitting. In every instance it is important to be able to secure the aligned pipe components during the joining process.

It is desirable to have a clamp assembly that is rugged and durable, provides quick adjustment and covers a wide range of pipe sizes. It is further desirable to have a clamp assembly capable of securing a piping component to a pipe jack having a V-shaped cradle.

SUMMARY OF THE INVENTION

A preferred embodiment of the clamp assembly of the present invention includes a header assembly, first and second arms, a stem assembly, and a ram assembly.

The header assembly preferably includes first and second ends and a plunger having an aperture with a portion of the aperture being threaded. The aperture forms a portion of a bore extending through the header assembly.

Each of the first and second arms are pivotally connected to the first and second ends, respectively, of the header assembly. The arms are in opposing spaced relationship with each arm having inwardly and outwardly facing surfaces.

The ram assembly preferably comprises first and second ends, each having a passageway through which at least a portion of an arm extends, and a contact surface.

The stem assembly comprises an upper stem end coupled to a handle, a lower stem end rotatably connected to the ram assembly, and a threaded stem portion arranged and designed to threadedly engage the aperture threaded portion.

The plunger has an engaged position in which the aperture threaded portion threadedly engages the threaded stem portion, and a disengaged position in which the aperture threaded portion does not threadedly engage the threaded stem portion.

BRIEF DESCRIPTION OF THE SEVERAL VIEWS OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings, in which:

FIG. 3 is an elevation view of the clamp assembly of FIG. 1 shown in a retracted position prior to clamping a pipe to a support head of a pipe support;

FIG. 4 is an elevation view of the clamp assembly of FIG. 3 shown clamping the pipe to the support head;

DESCRIPTION OF THE PREFERRED EMBODIMENTS

Figure 1:
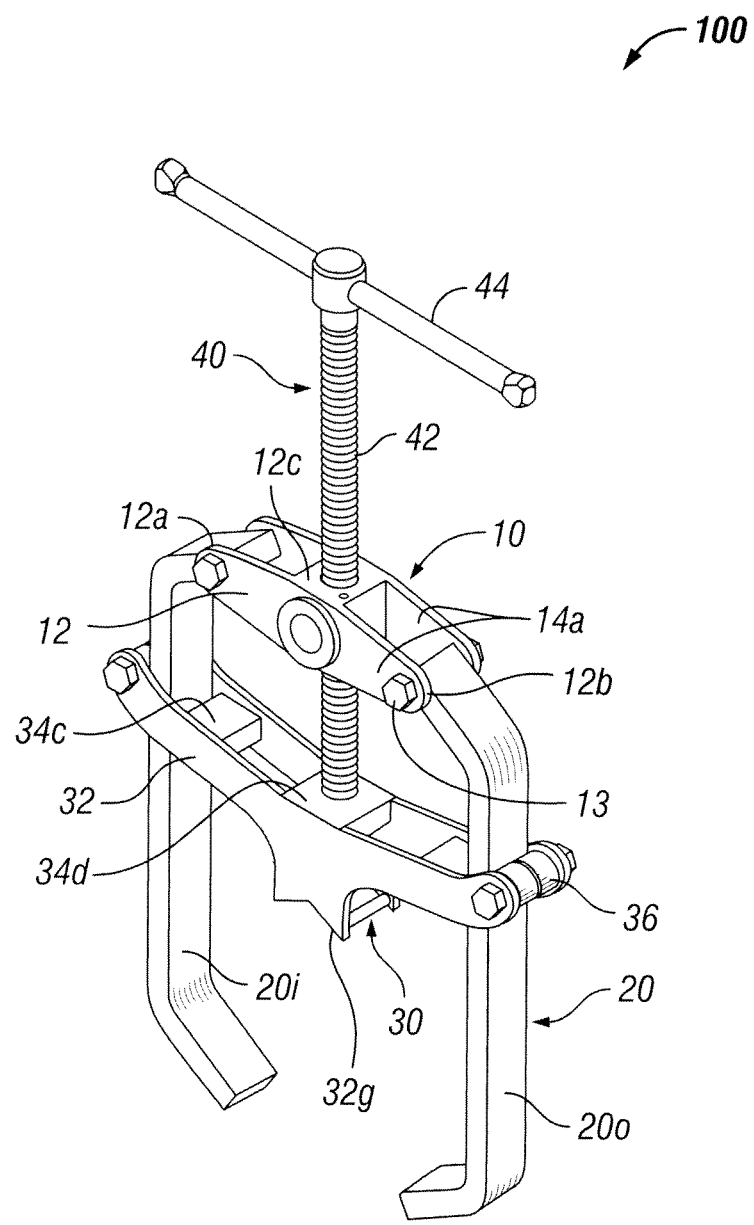
FIG. 1 is a perspective view of a preferred embodiment of the clamp assembly of the present invention.

The present invention will now be described with reference to the drawings. FIGS. 1-9 illustrate a preferred embodiment of the clamp assembly, generally referred to as 100. It is to be understood that the present invention is not limited to the illustrated embodiment. Referring to FIG. 1, the clamp assembly 100 includes a header assembly 10, a pair of rigid arms 20, a ram assembly 30 and a stem assembly 40.

Figure 2:
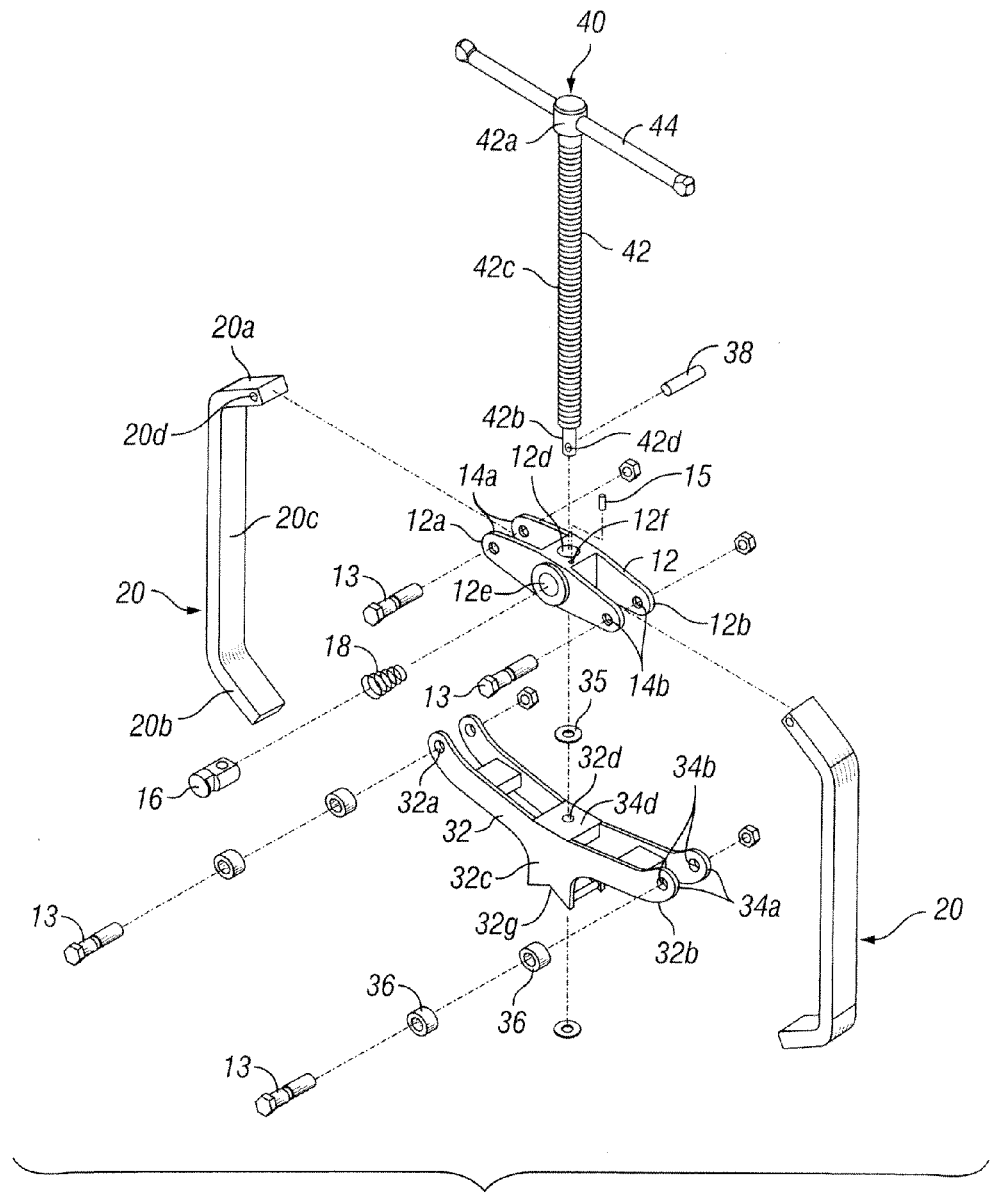
FIG. 2 is an exploded view of the clamp assembly of FIG. 1.

The stem assembly 40 includes a stem member 42 and a handle bar 44. The handle bar 44 is preferably coupled to an upper end 42a of the stem member 42. The stem member 42 includes a lower end 42b (FIG. 2) and a threaded portion 42c between the upper and lower ends 42a and 42b, respectively. As shown in FIG. 2, the lower end 42b preferably includes a transverse bore 42d through the stem member 42. Preferably, the threaded portion 42c has Acme threads.

Figure 8:
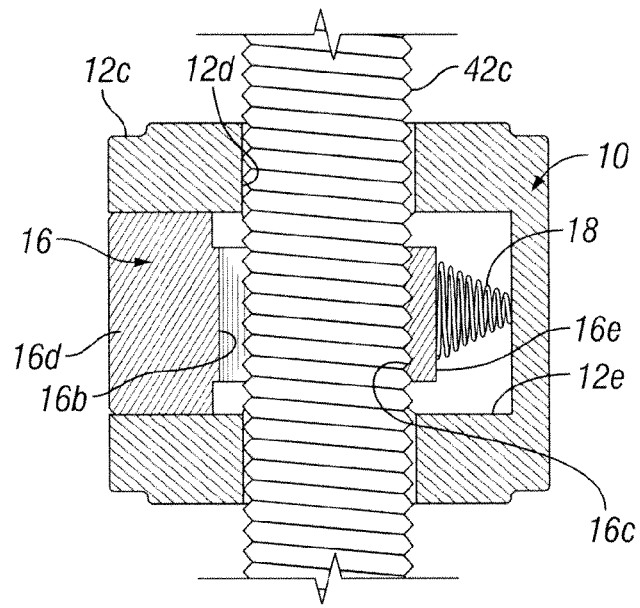
FIG. 8 is a partial cross-sectional view of a quick release mechanism of the clamp assembly of FIG. 1, the quick release mechanism shown in an engaged position.
Figure 9:
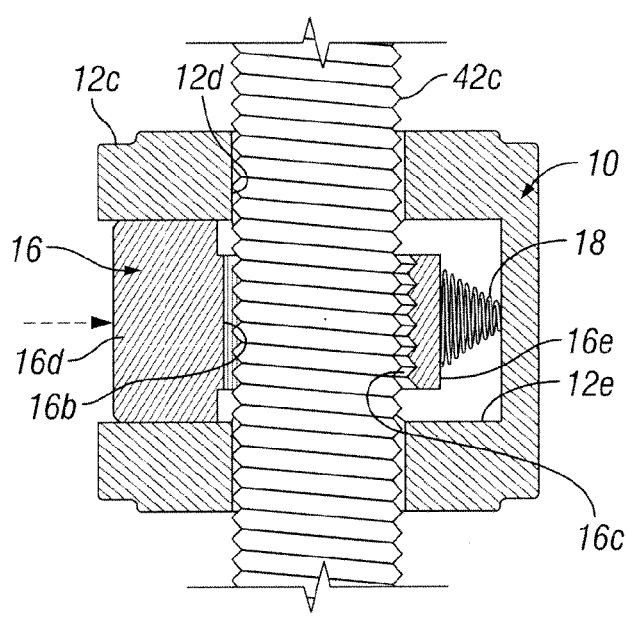
FIG. 9 is a view similar to FIG. 8 showing the quick release mechanism in a disengaged position.

The header assembly 10 preferably includes a header member 12 having a first end 12a, a second end 12b, and a central portion 12c. In the preferred embodiment, the first and second ends 12a and 12b, respectively, are identical. As shown in FIG. 2, each end 12a, 12b, includes a pair of spaced legs 14a having an aligned pair of holes 14b forming a yoke or fork-like configuration. Preferably, the central portion 12c of the header member 12 includes a passageway or bore 12d extending therethrough. As shown in FIGS. 8 and 9, the bore 12d is sized to allow the stem member 42 to extend through the bore 12d. The central portion 12c also includes a port 12e intersecting the bore 12d. Preferably, the port 12e is oriented transverse to the bore 12d.

Figure 6:
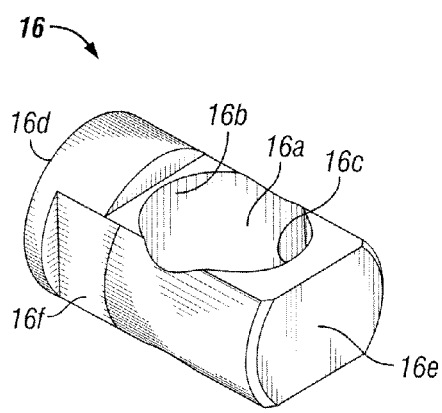
FIG. 6 is a perspective view of a plunger of the clamp assembly of FIG. 1.
Figure 7:
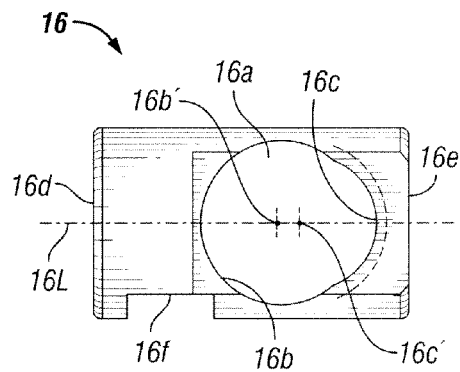
FIG. 7 is a plan view of the plunger of FIG. 6.

The header assembly 10 also includes a quick release mechanism comprising a plunger 16 and a biasing member 18. The biasing member 18 is preferably a spring. In the preferred embodiment illustrated in FIGS. 8 and 9, the spring 18 is a tapered spring. FIGS. 6 and 7 illustrate the plunger 16 according to the preferred embodiment of the present invention. In the illustrated embodiment, the plunger 16 has a body, generally circular in cross-section, having a diameter slightly less than the diameter of the port 12e so that the plunger 16 can slide axially within port 12e as shown in FIGS. 8 and 9. The plunger 16 includes an aperture 16a preferably extending transversely through the body of the plunger 16. The aperture 16a has a first portion 16b, preferably circle-like and having a diameter greater than the diameter of the threaded portion 42c of the stem member 42. The aperture 16a also includes a second circle-like threaded portion 16c sized to engage the stem threaded portion 42c. Preferably, the circle-like center point 16b' of the first portion 16b of the aperture 16a is offset from the circle-like center point 16c' of the second portion 16c along a longitudinal axis 16L of the plunger 16 as shown in FIG. 7.

Referring to FIGS. 6 and 7, the plunger 16 has first and second ends 16d and 16e, respectively, and a slot 16f for retaining the plunger 16 within the port 12e while permitting limited axial movement. The slot 16f is preferably oriented transverse to the longitudinal axis 16L of the plunger 16. As shown in FIG. 2, a biased plunger assembly is formed in the header assembly 10 by inserting into the port 12e the spring 18 followed by the plunger 16. The spring 18 is positionally maintained between the plunger second end 16e and an end surface of the port 12e formed in the header member 12 as shown in FIGS. 8 and 9. The central portion 12c of the header member 12 preferably includes a pin hole 12f which is oriented substantially transverse to the port 12e and intersects the port 12e. With the plunger 16 in the port 12e and partially compressing the spring 18, the plunger slot 16f is aligned with the pin hole 12f and a retaining member 15 (FIG. 2), preferably a pin, is inserted in the pin hole 12f and the plunger slot 16f. The inserted pin 15 prevents the removal of the plunger 16 from the header member 12.

The pair of rigid arms 20 in the preferred embodiment are identical although the present invention is not limited to the arms being identical. In the preferred embodiment, each arm 20 has upper and lower ends 20a and 20b, respectively, and a medial portion 20c as shown in FIG. 2. The medial portion 20c is preferably planer. The upper end 20a includes a bent portion forming an angle with respect to the medial portion 20c and also includes a joint means 20d for joining the arm 20 to the header assembly 10. As shown in FIG. 2, the joint means 20d is preferably an opening through the arm 20. The lower end 20b of the arm 20 also includes a bent portion forming an angle with respect to the medial portion 20c.

Referring to FIG. 2, the rigid arms 20 are pivotally connected to the header member 12. In the preferred embodiment, the opening 20d of the arm upper end 20a is positioned between and aligned with the holes 14b in the pair of spaced legs 14a and a pin or fastener 13 is inserted through the aligned opening to form the pivot connection. In the illustrated embodiment the fastener 13 is shown as a threaded bolt and nut. The arms 20 are connected to the header member 12 such that the angled lower ends 20b of the arms 20 face one another in the assembled condition of the clamp assembly 100. For purposes of further describing the preferred embodiment, the arms 20 will be described as having an inwardly facing surface 20i and an outwardly facing surface 20o as shown in FIG. 1. In the preferred embodiment, the outwardly facing surface 20o of the medial portion 20c is preferably planer.

The ram assembly 30 includes a ram member 32 including a first end 32a, a second end 32b, and a central portion 32c having a lower gripping or contact surface 32g. In the preferred embodiment, the first and second ends 32a and 32b, respectively, are identical. As shown in FIG. 2, each end 32a, 32b, includes a pair of spaced extensions 34a having an aligned pair of holes 34b forming a yoke or fork-like configuration. One or more rollers 36 are maintained between each pair of spaced extensions 34a by a fastener 13 extending through the pair of holes 34b and the rollers 36. In the preferred embodiment, the rollers 36 are arranged and designed to contact the outwardly facing surface 20o of the rigid all is 20. It may be desirable for the ram member 32 to include a pair of spacers 34c (FIG. 1) or spacer surfaces adjacent to the inwardly facing surfaces 20i of the arms 20 to limit the inward movement and/or spacing between the arms 20.

Preferably, the central portion 32c of the ram member 32 includes a hole 32d extending through an upper plate 34d of the ram member 32 The hole 32d is sized to allow the lower end 42b of the stem member 42 to extend through the hole 32d. As shown in FIG. 2, the lower end 42b of the stem member 42 preferably has a smaller diameter than the threaded portion 42c. The hole 32d is preferably smaller in diameter than the threaded portion 42c of the stem member 42.

The assembly of the stem assembly 40 to the header and ram assemblies 10 and 30, respectively, will now be discussed. Referring to FIG. 2, with the biased plunger assembly installed in the header assembly 10 (as discussed above), the plunger 16 is depressed as shown in FIG. 9 and the stem member 42 is inserted through the bore 12d of the header member 12 and the aperture 16a of the plunger 16. It is to be understood that with the plunger 16 depressed as shown in FIG. 9, the threaded portion 42c of the stem member 42 freely passes through the first portion 16b of the aperture 16a. Upon removal of the plunger depression force, the spring 18 pushes against the plunger second end 16e and causes the second threaded portion 16c of the aperture 16a to engage the threaded portion 42c of the stem member 42 as shown in FIG. 8.

Referring to FIG. 2, the stem lower end 42b preferably receives a flat washer 35 prior to insertion through the hole 32d in the upper plate 34d of the ram member 32. Another washer 35 is preferably inserted on the stem lower end 42b extending through the upper plate 34d before inserting a pin 38, preferably a roll pin, through the transverse bore 42d of the stem member 42. It is to be understood that the stem member 42 is free to rotate relative to the ram assembly 30 and axial movement of the stem member 42 results in similar movement of the ram assembly 30.

Referring to FIGS. 3 and 4, the preferred embodiment of the clamp assembly 100 is shown being used to secure a pipe P1 to an object support 80. The object support 80 preferably includes a support head 82, preferably a V-shaped support head. The V-shaped support head 82, commonly referred to as a "V-head," is typical for the support of cylindrical objects such as pipe P1. It is to be understood that the object support 80 may comprise a pipe jack as disclosed in assignee's U.S. Pat. No. 5,165,665.

With a section of pipe P1 supported by the V-shaped support head 82 of the object support 80, the clamp assembly 100 is brought into alignment with the support head 82. As shown in FIG. 3, the header assembly 10 is preferably initially proximal or adjacent to the ram assembly 30. In this position, each spacer 34c (FIG. 1) preferably contacts the inwardly facing surface 20i at the upper bent portion 20a of the arm 20 forcing the lower and medial portions 20b and 20c of each of the arms 20 to spread outwardly from one another. In the clamp position shown in FIG. 3, the ram rollers 36 (FIG. 1) are preferably proximal or adjacent to the outwardly facing surface 20o of the upper bent portion 20a of the arm 20, which allows the arms 20 to spread outwardly from one another. Preferably, the spacing S1 between the arm lower ends 20b is greater than the distance D1 between the ends 82a and 82b of the support head 82. Preferably, the spacing S1 is also greater than the outside diameter of the pipe P1.

With the ram gripping surface 32g contacting the pipe P1, the stem assembly 40 may be rotated such that the threaded engagement of the stem 42 and the threaded portion 16c (FIG. 7) of the plunger 16 moves the header assembly 10 away from the ram assembly 30 as shown in FIG. 4. As the header assembly 10 moves away from the ram assembly 30 (from the position shown in FIG. 3 to FIG. 4), the ram rollers 36 (FIG. 1) roll along the outwardly facing surface 20o of the medial portion 20c of the arms 20. The spacing between the ram rollers 36 is designed such that as the rollers 36 travel along the length of the arm medial portion 20c, the spacing between the arm medial portions 20c remains at least slightly greater that the distance D1. The handle bar 44 is preferably used to tighten the clamp assembly 100 until the inwardly facing surfaces 20i of the arm lower ends 20b are securely engaged with the support head 82. Preferably, the angle of the arm lower end 20b corresponds to the angled V-head 82 such that a substantial amount of surface contact exists between the arm lower end 20b and the V-head 82 as shown in FIG. 4. In the clamped position shown in FIG. 4, the pipe P1 is firmly secured to the object support 80 by the clamp assembly 100.

Figure 5:
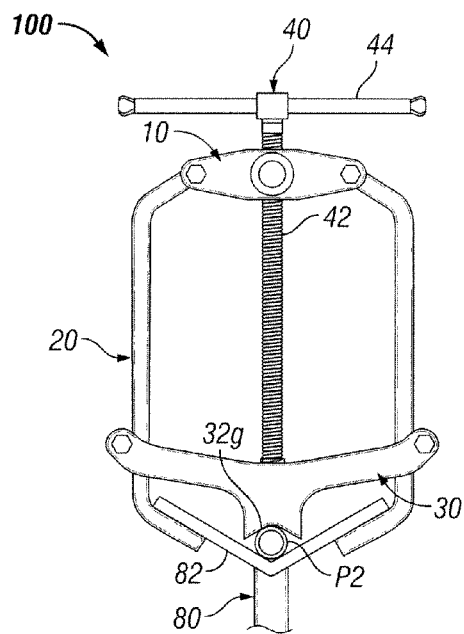
FIG. 5 is an elevation view of the clamp assembly of FIG. 1 shown clamping a small pipe to a support head.

FIG. 5 shows the clamp assembly 100 clamping a small diameter pipe P2 to the object support 80. The header assembly 10 in this instance is distant or further from the ram assembly 30 and proximal the handle bar 44 of the stem assembly 40. It is to be understood that in the clamped positions of FIGS. 4 and 5, the pipes P1 and P2, respectively, are frictionally engaged with the support head 82 and the ram gripping surface 32g and the pair of arms 20 are engaged with the support head 82. In the clamped position, the clamp assembly 100 secures the pipes P1 and P2 from movement relative to the support head 82.

It is to be understood that for quick adjustment of the header assembly 10 relative to the ram assembly 30, the spring-biased plunger 16 may be depressed by pushing against the plunger first end 16d and disengaging the plunger threaded portion 16c from the stem threaded portion 42c. When the plunger 16 is depressed to the position shown in FIG. 9, the stem member 42 is free to move axially through the enlarged aperture portion 16b of the plunger 16 independently of stem rotation, and the header assembly 10 is free to move relative to the ram assembly 30 independently of stem rotation. Upon repositioning the header assembly 10, the depression force is removed and the spring 18 forces the plunger 16 to its biased position as shown in FIG. 8 with the threaded portions 16c and 42c re-engaging.

It is to be understood that in order to release the clamp assembly 100 from the clamped position as shown in FIGS. 4 and 5, the stem member 42 is slightly rotated in the direction to loosen, typically a counter-clockwise direction, to relieve the wedged, frictional engagement of the threads of the stem member 42 and the plunger 16 caused by the axial force on the stem member 42. Upon such loosening of the clamp assembly 100, the plunger 16 may be depressed to rapidly reposition the header assembly 10 towards the ram assembly 30 for removal of the clamp assembly 100. It is also to be understood that final tightening of the clamp assembly 100 into the clamped position is accomplished by rotating the stem member 42 in the tightening direction, typically the clockwise direction, via the handle bar 44.

Figure 10:
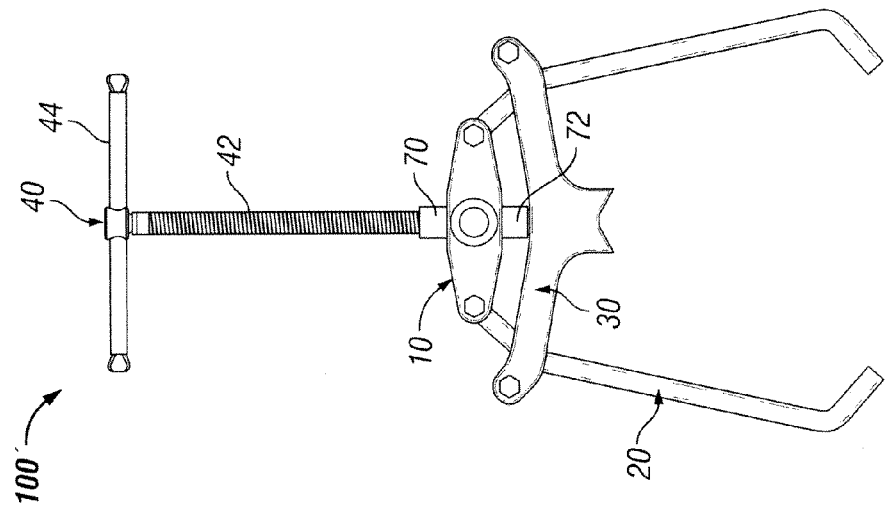
FIG. 10 is an elevation view of a second preferred embodiment of the clamp assembly shown in a fully retracted position.
Figure 11:
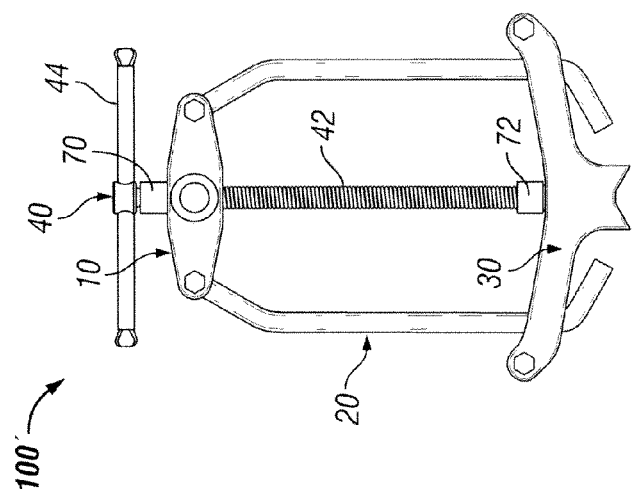
FIG. 11 is an elevation view of the clamp assembly of FIG. 10 shown in a fully extended position.

A second preferred embodiment of the clamp assembly, referred to as 100', is illustrated in FIGS. 10 and 11. The design and function of the clamp assembly 100' is extremely similar to the clamp assembly 100 discussed above. It is to be understood that the numerals in FIGS. 10 and 11 corresponding with like numerals in FIGS. 1-9 refer to similar components. Thus, for example, the clamp assembly 100' includes a header assembly 10, a pair of rigid arms 20, a ram assembly 30 and a stem assembly 40. It is to be further understood that all the features described with reference to clamp assembly 100 also apply to clamp assembly 100'.

Referring to FIGS. 10 and 11, the clamp assembly 100' includes first and second spacers 70 and 72, respectively. Preferably, the spacers 70 and 72 are circular members having a bore extending therethrough. The spacer bore is at least slightly larger than the outside diameter of the stem member 42. Preferably, the spacers 70 and 72 are permitted to axially slide along the stem member 42. The spacers 70 and 72 preferably have a height of at least one inch (1"). The first spacer 70 is installed on the stem member 42 between the handle bar 44 and the header assembly 10. The second spacer 72 is installed on the stem member 42 between the header assembly 10 and the ram assembly 30. The second spacer 72 maintains a spacing or clearance between the header assembly 10 and the ram assembly 30 when the clamp assembly 100' is in the fully retracted position as shown in FIG. 10. The clearance is approximately the height of the second spacer 72. The clearance provided by the second spacer 72 is designed to eliminate potential "pinch points," as for example of the user's fingers or hands, between the header assembly 10 and the ram assembly 30. Similarly, the first spacer 70 maintains a spacing or clearance between the handle bar 44 and header assembly 10 when the clamp assembly 100' is in the fully extended position as shown in FIG. 11. This clearance is approximately the height of the first spacer 70 and is designed to eliminate potential "pinch points" of the user's fingers or hands between the handle bar 44 and the header assembly 10.

While the invention has been described with reference to the drawings of the preferred embodiments, the invention is not limited to the preferred embodiments. For example, the present invention is not limited to securing a member (for example, a pipe) to a support object. In an alternate embodiment, the pair of arms could be arranged and designed to have lower ends adapted to directly grip or contact the member being clamped. In such an embodiment, the clamp assembly need not engage an object support 80.

Additionally, it is to be understood that an alternate embodiment of the present invention may include a pair of arms with each arm having an elongated slot in which one or more ram rollers travel. The spacing between the lower end of the arms is controlled by the relative spacing of the ram assembly relative to the header assembly.

As will be readily apparent to those skilled in the art, the present invention may be produced in other specific forms without departing from its spirit or essential characteristics. The present embodiment, is therefore, to be considered as illustrative and not restrictive, the scope of the invention being indicated by the claims rather than the foregoing description, and all changes which come within the meaning and range of the equivalence of the claims are herefore intended to be embraced therein.

I claim:
1. A clamp assembly comprising:
   a header assembly having first and second ends and a plunger having an aperture with a portion of said aperture being threaded, said aperture forming a portion of a bore extending through said header assembly;
   first and second arms, said first arm pivotally connected to said header assembly first end and said second arm piv- otally connected to said header assembly second end, said first and second arms in opposing spaced relationship;

a ram assembly having a ram first end with a passageway through which at least a portion of said first arm extends and a rum second end with a passageway through which at least a portion of said second arm extends, said ram assembly having a contact surface;

a stem assembly comprising an upper stem end coupled to a handle, a lower stem end rotatably connected to said ram assembly, and a threaded stem portion arranged and designed to threadedly engage said aperture threaded portion;

said plunger having an engaged position in which said aperture threaded portion threadedly engages said threaded stem portion, and a disengaged position in which said aperture threaded portion does not threadedly engage said threaded stem portion.

2. The clamp assembly of claim 1, wherein said plunger is spring-biased in the engaged position.

3. The clamp assembly of claim 1, wherein said threaded stem portion of said stem assembly is allowed to slide axially within said aperture in the disengaged position.

4. The clamp assembly of claim 1, wherein said aperture further comprises a portion sized larger than said threaded aperture portion so as to allow said threaded stern portion to slide axially within said larger sized aperture portion.

5. The clamp assembly of claim 1, wherein said plunger uses sliding movement to go from the engaged posit on to the disengaged position.

6. The clamp assembly of claim 1, wherein said first and second arms are rigid.

7. The clamp assembly of claim 6, wherein each said ram assembly end passageway is partially defined by an outer limiting member restricting outward movement of said arms.

8. The clamp assembly of claim 7, wherein each said outer limiting member comprises a roller arranged to contact an outwardly facing surface of said arm.

9. The clamp assembly of claim 7, wherein each of said first and second arms comprises a medial portion having a planer surface arranged to contact a said outer limiting member.

10. The clamp assembly of claim 9, wherein a constant outwardly spaced arm distance is maintained as said outer limiting members travel along the length of said planer surface of said medial portion of said arms.

11. The clamp assembly of claim 6, wherein each said ram assembly end passageway is partially defined by an inner limiting member restricting inward movement of said arms.

12. The clamp assembly of claim 11, wherein each of said first and second arms comprises a medial portion having a planer surface arranged to contact said inner limiting member.

13. A clamp assembly comprising:

a header assembly including a header member having a first end and a second end and a bore extending through said header member, said header assembly including a plunger coupled to said header member, said plunger having an aperture with a portion of said aperture being threaded;

a rigid first arm having upper and lower ends, said first arm pivotally connected to said header first end;

a rigid second arm having upper and lower ends, said second arm pivotally connected to said header second end;

said first and second arms in opposing spaced relationship, said first and second arms each having an inwardly facing surface and an outwardly facing surface;

a stem assembly comprising a threaded stem portion, a lower stem end and an upper stem end coupled to a handle, said threaded stem portion designed to threadedly engage said aperture threaded portion;

a ram assembly comprising:
  a ram first end with a passageway through which said first arm extends;
  a ram second end with a passageway through which said second arm extends;
  a contact surface;

said lower stem end rotatably connected to said ram assembly; and said plunger having an engaged position in which said aperture threaded portion threadedly engages said threaded stem portion, and a disengaged position in which said aperture threaded portion does not threadedly engage said threaded stem portion.

14. The clamp assembly of claim 13, wherein said plunger is spring-biased in the engaged position.

15. The clamp assembly of claim 13, wherein in the disengaged position said threaded stem portion of said stem assembly is allowed to slide axially within said aperture.

16. The clamp assembly of claim 13, wherein said aperture further comprises a portion sized larger than said threaded aperture portion so as to allow said threaded stem portion to slide axially within said larger sized aperture portion.

17. The clamp assembly of claim 13, wherein said plunger uses sliding movement to go from the engaged position to the disengaged position.

18. The clamp assembly of claim 13, wherein each said ram assembly passageway is partially defined by an outer limiting member restricting outward movement of said arms.

19. The clamp assembly of claim 18, wherein each said outer limiting member comprises a roller arranged to contact said outwardly facing surface of said arm.

20. The clamp assembly of claim 18, wherein each of said first and second arms comprises a medial portion having a planer surface arranged to contact said outer limiting member.

21. The clamp assembly of claim 18, wherein the clamp assembly has a clamped position wherein a clamped member is secured between said ram assembly contact surface and said lower ends of said first and second arms.

22. The clamp assembly of claim 21, wherein in the clamped position, said first and second arms are urged outwardly against said outer limiting members.

23. The clamp assembly of claim 21, further comprising a support head for supporting the clamped member, and said lower ends of said first and second arms are engaged with said support head.

* * * * *